(12) United States Patent
Gehrke et al.

(10) Patent No.: US 8,799,264 B2
(45) Date of Patent: Aug. 5, 2014

(54) METHOD FOR IMPROVING SEARCH ENGINE EFFICIENCY

(75) Inventors: Johannes Gehrke, Heidelberg (DE); Robbert Van Renesse, Ithaca, NY (US); Fred Schneider, Ithaca, NY (US)

(73) Assignee: Microsoft Corporation, Redmond, WA (US)

( * ) Notice: Subject to any disclaimer, the term of this patent is extended or adjusted under 35 U.S.C. 154(b) by 647 days.

(21) Appl. No.: 12/332,979

(22) Filed: Dec. 11, 2008

(65) Prior Publication Data
US 2009/0157666 A1    Jun. 18, 2009

Related U.S. Application Data

(60) Provisional application No. 61/013,705, filed on Dec. 14, 2007.

(51) Int. Cl.
*G06F 7/08* (2006.01)
*G06F 17/30* (2006.01)

(52) U.S. Cl.
USPC ........... 707/711; 707/706; 707/715; 707/741; 707/770

(58) Field of Classification Search
USPC ........... 707/3, 5, 999.003, 999.005, 706, 715, 707/741, 770, 999.006, 999.01, 711, 713
See application file for complete search history.

(56) References Cited

U.S. PATENT DOCUMENTS

| | | | |
|---|---|---|---|
| 7,293,016 B1 | 11/2007 | Shakib et al. | |
| 7,567,959 B2 * | 7/2009 | Patterson | 1/1 |
| 8,131,712 B1 * | 3/2012 | Thambidorai et al. | 707/715 |
| 2008/0033943 A1 | 2/2008 | Richards et al. | |
| 2010/0161617 A1 * | 6/2010 | Cao et al. | 707/741 |

* cited by examiner

*Primary Examiner* — Bruce Moser
(74) *Attorney, Agent, or Firm* — Tom Wong; Jim Ross; Micky Minhas

(57) ABSTRACT

In a method for improving the efficiency of a search engine in accessing, searching and retrieving information in the form of documents stored in document or content repositories, the search engine comprises an array of search nodes hosted on one or more servers. An index of the stored document is created. The search engine processes a user search query and returns a result set of query-matching documents. The index of the search engine is configured on the basis of one or more document properties and partitioned, replicated and distributed over the array of the search nodes. The search queries are processed on the basis of the distributed index. The method realizes a framework for distributing the index of a search engine across several hosts in a computer cluster, relying on three orthogonal mechanisms for index distribution, namely index partitioning, index replication, and assignment of replicas to hosts. In this manner, different ways of configuring the index of a search engine are obtained and provide a much improved resource usage and performance, combined with any desired level of fault tolerance.

20 Claims, 4 Drawing Sheets

METHOD FOR IMPROVING SEARCH ENGINE EFFICIENCY

Figure 1:
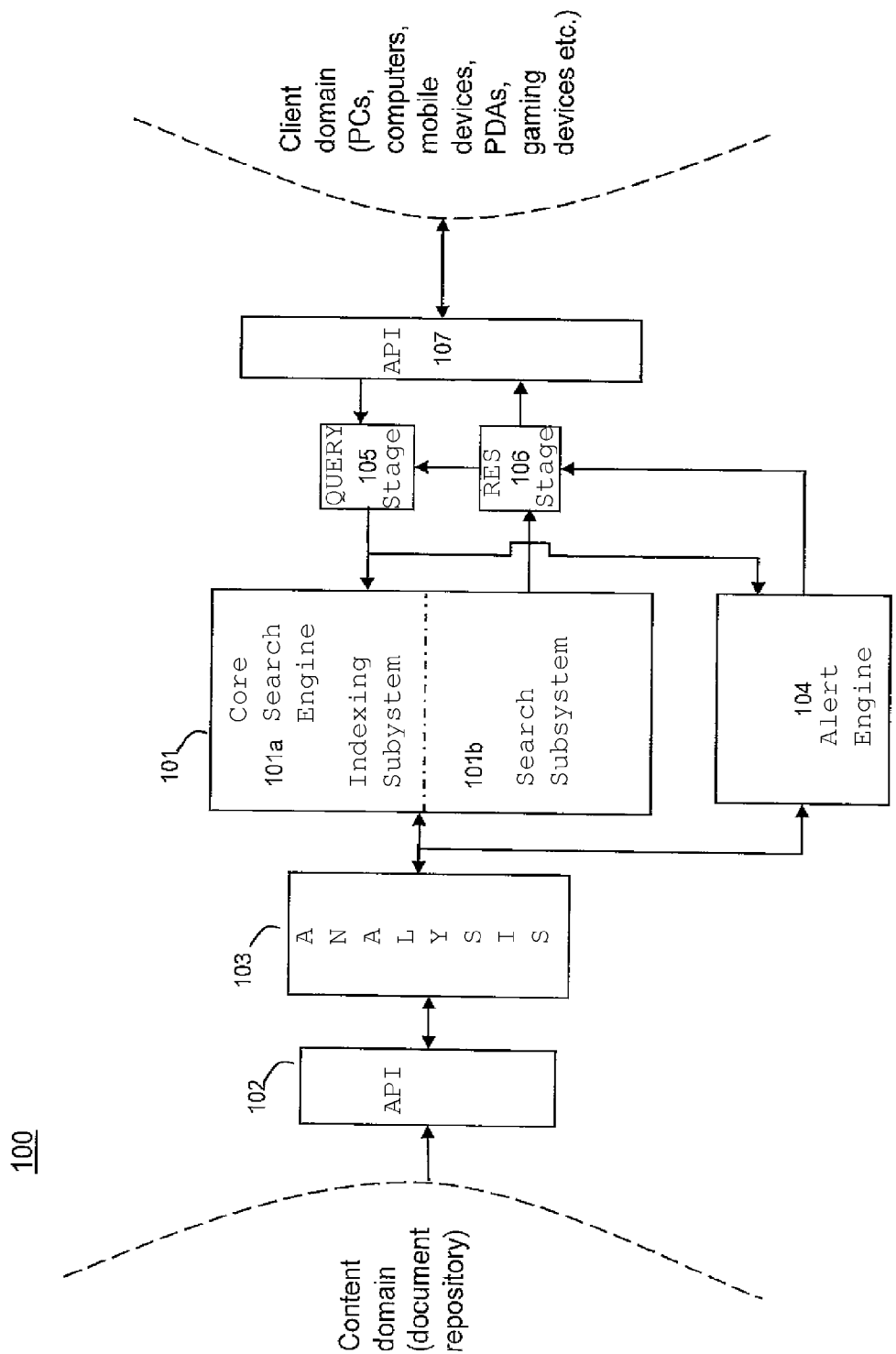

This Nonprovisional application claims priority under 35 U.S.C. §119(e) on U.S. Provisional Application No(s). 61/013,705 filed on Dec. 14, 2007, the entire contents of which are hereby incorporated by reference.

The present invention concerns a method for improving search engine efficiency with respect to accessing, searching and retrieving information in the form of documents stored in document or content repositories, wherein an indexing subsystem of the search engines crawls the stored documents and generates an index thereof, wherein applying a user search query to the index shall return a result set of at least some query-matching documents to the user, and wherein the search engine comprises an array of search nodes hosted on one or more servers.

Particularly the invention discloses how to build a new framework for index distribution on a search engine, and even more particularly on an enterprise search engine.

Building a search engine is challenging for several reasons:
Performance. The latency of computing a query response needs to be very low, and the search engine needs to support a high throughput of queries.
Scalability. The performance needs to scale with the number of documents and the arrival rate of queries.
Fault-tolerance. The search engine needs to maintain high availability and high throughput even during hardware failures.

To satisfy the above three requirements, search engines use sophisticated methods for distributing their indices across a possibly large cluster of hosts.

PRIOR ART

An overview and discussion of the prior art relevant to the present invention shall now be given. All literature references are identified by abbreviations in parenthesis at the appropriate location in the following. A full bibliography is given in an appendix at the end of the description.

In order to improve the efficiency of search systems there has recently been much research on distribution of search engine indices. Early work concerned how to distribute posting lists and explored the trade-off between distributing posting lists based on index terms (herein also called keywords) versus documents [Bad01, MMR00, RNB98, TGM93, CKE+90, MWZ06]. The present invention takes as its point of departure the insight that making a global choice between these two alternatives is suboptimal because the statistical properties of keywords and documents vary in a typical search environment, as exemplified below.

For a keyword k whose posting list fits on a single disk page, distributing k's posting lists across multiple hosts actually increases response time for queries that involve k, because many hosts will be involved in retrieving the posting list, although a single host would be able to retrieve that posting list with a single disk access. For a keyword $k^l$ whose posting list does not fit on a single disk page, however, distributing $k^l$'s posting list across a set of hosts reduces response time since different parts of the posting list can be retrieved in parallel.

For an unpopular keyword k that appears in only a few queries, replicating its posting list wastes resources since there is little opportunity for parallelism in executing the queries and thus not many queries ever read k's posting list in parallel from different hosts. The posting list for a popular keyword $k^l$, however, is accessed by many queries and should thus be replicated to enable parallelism.

In order to better understand the prior art, a brief discussion of a search engine architecture as known in the art and currently used shall be given with reference to FIG. 1, which shows a block diagram of a search engine as will be known to persons skilled in the art, its most important subsystems, and its interfaces respectively to a content domain, i.e. the repository of documents that may be subjected to a search, and a client domain comprising all users posing search queries to the search engine for retrieval of query-matching documents from the content domain.

The search engine 100 of the present invention, as known in the art, comprises various subsystems 101-107. The search engine can access document or content repositories located in a content domain or space wherefrom content can either actively be pushed into the search engine, or using a data connector be pulled into the search engine. Typical repositories include databases, sources made available via ETL (Extract-Transform-Load) tools such as Informatica, any XML-formatted repository, files from file servers, files from web servers, document management systems, content management systems, email systems, communication systems, collaboration systems, and rich media such as audio, images and video. Retrieved documents are submitted to the search engine 100 via a content API (Application Programming Interface) 102. Subsequently, documents are analyzed in a content analysis stage 103, also termed a content pre-processing subsystem, in order to prepare the content for improved search and discovery operations. Typically, the output of this content analysis stage 103 is an XML representation of the input document. The output of the content analysis is used to feed the core search engine 101. The core search engine 101 can typically be deployed across a farm of servers in a distributed manner in order to allow for large sets of documents and high query loads to be processed. The core search engine 101 accepts user requests and produces lists of matching documents. The document ordering is usually determined according to a relevance model that measures the likely importance of a given document relative to the query. In addition, the core search engine 101 can produce additional metadata about the result set, such as summary information for document attributes. The core search engine 101 in itself comprises further subsystems, namely an indexing subsystem 101a for crawling and indexing content documents and a search subsystem 101b for carrying out search and retrieval proper. Alternatively, the output of the content analysis stage 103 can be fed into an optional alert engine 104. The alert engine 104 will have stored a set of queries and can determine which queries that would have been satisfied by the given document input. A search engine can be accessed from many different clients or applications which typically can be mobile and computer-based client applications. Other clients include PDAs and game devices. These clients, located in a client space or domain, submit requests to a search engine query or client API 107. The search engine 100 will typically possess a further subsystem in the form of a query analysis stage 105 to analyze and refine the query in order to construct a derived query that can extract more meaningful information. Finally, the output from the core search engine 101 is typically further analyzed in another subsystem, namely a result analysis stage 106 in order to produce information or visualizations that are used by the clients. Both stages 105 and 106 are connected between the core search engine 101 and the client API 107, and in case the alert engine 104 is present, it is connected in parallel to the core search engine 101 and between the content analysis stage 103 and the query and result analysis stages 105; 106.

In order to improve the search speed of a search engine International published application WO00/68834 proposes a search engine with two-dimensional linearly scalable parallel architecture for searching a collection of text documents D, wherein the documents can be divided into a number of partitions $d_1, d_2, \ldots, d_n$, wherein the collection of documents D is pre-processed in a text filtration system such that a pre-processed document collection $D_p$ and corresponding pre-processed partitions $d_{p1}, d_{p2}, \ldots, d_{pn}$ are obtained, wherein an index I can be generated from the document collection D such that for each previous pre-processed partition $d_{p1}, d_{p2}, \ldots, d_{pn}$ a corresponding index $i_1, i_2, \ldots, i_n$ is obtained, wherein searching a partition d of the document collection D takes place with a partition-dependent data set $d_{p,k}$, where $1 \leq k \leq n$, and wherein the search engine comprises data processing units that form sets of nodes connected in a network. A first set of nodes comprises dispatch nodes $N_\alpha$, a second set of nodes search nodes $N_\beta$ and a third set of nodes indexing nodes $N_\gamma$. The search nodes $N_\beta$ are grouped in columns which via the network are connected in parallel between the dispatch nodes $N_\alpha$ and an indexing node $N_\gamma$. The dispatch nodes $N_\alpha$ are adapted for processing search queries and search answers, the search nodes $N_\beta$ are adapted to contain search software, and the indexing nodes $N_\gamma$ are adapted for generally generating indexes I for the search software. Optionally, acquisition nodes $N_\delta$ are provided in a fourth set of nodes and adapted for processing the search answers, thus relieving the dispatch nodes of this task. The two-dimensional scaling takes place respectively with a scaling of the data volume and a scaling of the search engine performance through a respective adaptation of the architecture.

Figure 2:
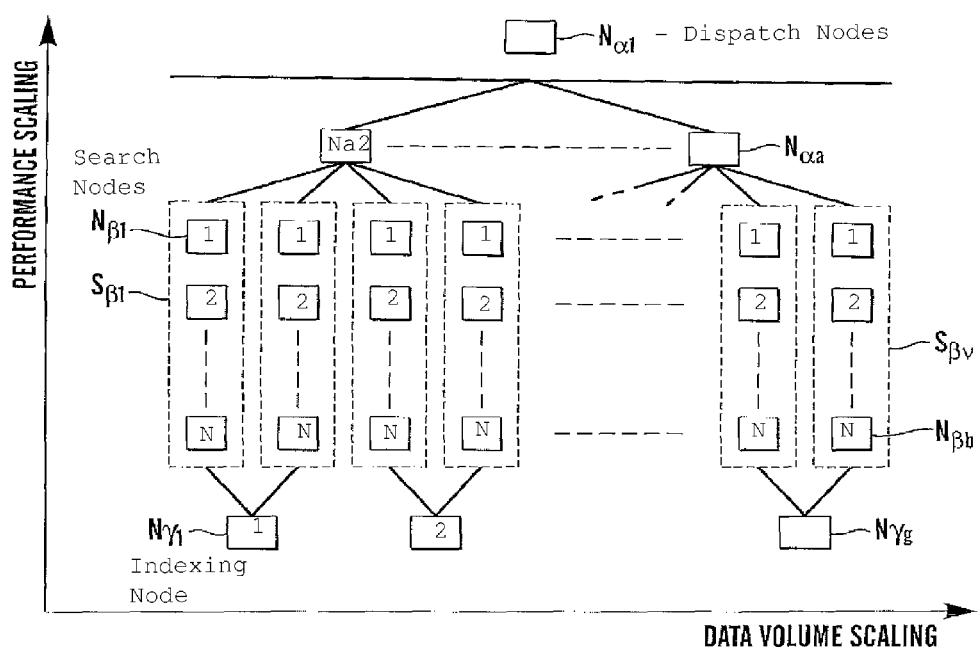

The schematic layout of this scalable search engine architecture is shown in FIG. 2, illustrating the principle of two-dimensional scaling. An important benefit of this architecture is that the query response time is essentially independent of catalogue size, as each query is executed in parallel on all search nodes $N_\beta$. Moreover, the architecture is inherently fault-tolerant such that faults in individual nodes will not result in a system breakdown, only in a temporary reduction of the performance.

Although the architecture shown in FIG. 2 provides a multilevel data and functional parallelism such that large volumes of data can be searched efficiently and very fast by a large number of users simultaneously, it is encumbered with certain drawbacks and hence far from optimal. This is due to the fact that the row and column architecture is based on a mechanical and rigid partition scheme, which does not take account of modalities in the keyword distribution and the user behaviour, as expressed by frequency distributions of search terms or keywords, and access patterns.

Further, U.S. Pat. No. 7,293,016 B1 (Shakib & al., assigned to Microsoft Corporation) discloses how to arrange indexed documents in an index according to a static ranking and partitioned according to that ranking. The index partition is scanned progressively, starting with a partition containing those documents with the highest static rank, in order to locate documents containing a search word, and a score is computed based on a present set of documents located thus far in the search and on basis of the range of static ranks to a next partition to be scanned. The next partition is scanned to locate the documents containing a search word when the calculated score is above a target score. A search can be stopped when no more relevant results will be found in the next partition.

US published patent application No. 2008/033943 A1 (Richards & al., assigned to BEA Systems, Inc.) concerns a distributed search system with a central queue of document-based records wherein a group of nodes is assigned to different partitions, indexes for a group of documents are stored in each partition, and the nodes in the same partition independently process document-based records from the central queue in order to construct the indexes.

Existing prior art does not provide a design framework built on the general notions of keyword and query distribution properties and thus does not achieve the flexibility of this design, with resulting performance improvements and reduction in resource requirements.

A specific concern has been growth of the index, and several specific techniques that gracefully handle on-line index construction have been developed [BCL06]. These techniques are orthogonal to the framework resulting from applying the method according to the present invention, as shall be apparent from a detailed description thereof.

The present invention does not take specific ranking algorithms into account since it is assumed that the user always wants all query results. However, these ideas can be extended in a straightforward manner to some of the recently developed ranking algorithms [RPB06, AM06, LLQ+07] and algorithms for novel query models [CPD06, LT1T07, ZS07, DEFS06, TKT06, JRMG06, YJ06, KCMK06]. Algorithms for finding the best matching query results when combining matching functions have also been the focus of much research [PZSD96, Fag99, MYL02]. These techniques are, however, orthogonal to an index distribution framework as realized by the method of the present invention, and they can also be incorporated easily.

The techniques employed by the present invention for query processing with partitioned posting lists are based on fundamental ideas drawn from parallel database systems [DGG+86]; however, parallel database systems were developed for database management systems that store structured data, whereas the focus of the present invention is on enterprise and Internet search where search queries are executed over collections of often unstructured or semi-structured documents.

There is also prior art concerning text query processing in peer-to-peer systems where the goal is to coordinate loosely coupled hosts with an emphasis to find query results without broadcasting a query to all hosts in the network [RV03, LLH+03, ODODg02, SMwW+03CAN02, KRo02, SL02, TXM03, TXD03, BJR03, TD04]. The main assumption of these prior art publications concerns the degree of coupling between the hosts, and this is different from the initial conception of the present invention which assumes that all hosts are tightly coupled and are under control of a single entity, for example, in a cluster in an enterprise data center, which is the dominant architecture today. The conceptual framework on which the present invention builds, maps directly onto this architecture by assuming a tightly coupled set of hosts.

In view of the shortcomings and disadvantages of the above-mentioned prior art, it is a major object of the present invention to provide a method that significantly enhances the performance of a search engine.

Another object of the present invention is to configure the index of a search engine and specifically an enterprise search engine on basis of recognizing that keywords and documents will differ both with regard to intrinsic as well as to extrinsic properties, for instance such as given by modalities in search and access patterns.

Finally, it is an object of the present invention to optimize an index configuration with regard to inherent features of the search system itself as well as to its operating environment.

The above-mentioned objects as well as further features and advantages are realized according to the present invention with a method that is characterized by configuring the index of the search engine on basis of one or more document properties, and at least one of a fault-tolerance level, a required search performance, document meta-properties, and an optimal resource utilization;

partitioning the index; replicating the index; distributing the thus partitioned and replicated index over the array of search nodes, such that index partitions and replicas thereof are assigned to said one or more servers hosting the array of search nodes, and processing search queries on the basis of the distributed index.

Further features and advantages of the present invention shall be apparent from the appended dependent claims.

Figure 3:
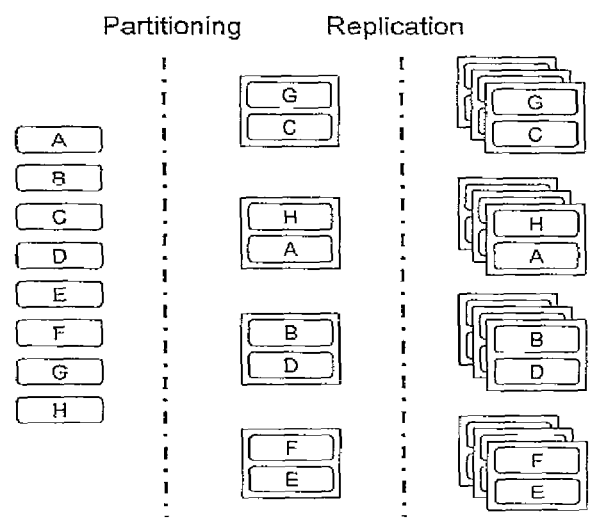
Figure 4:
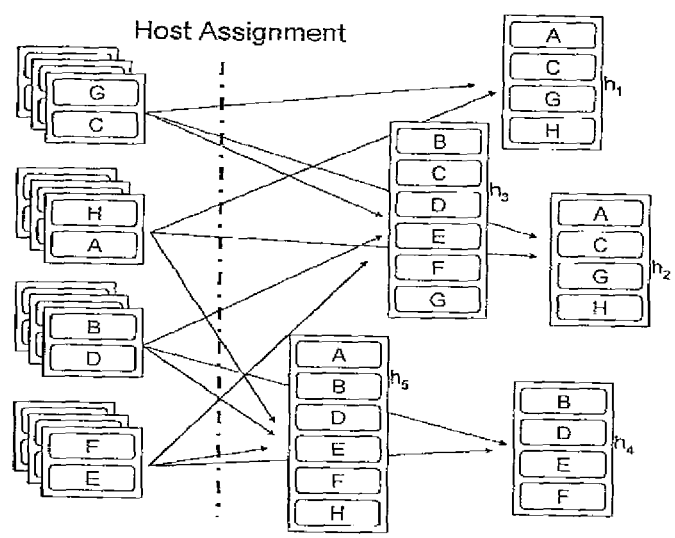
Figures 5, 6:
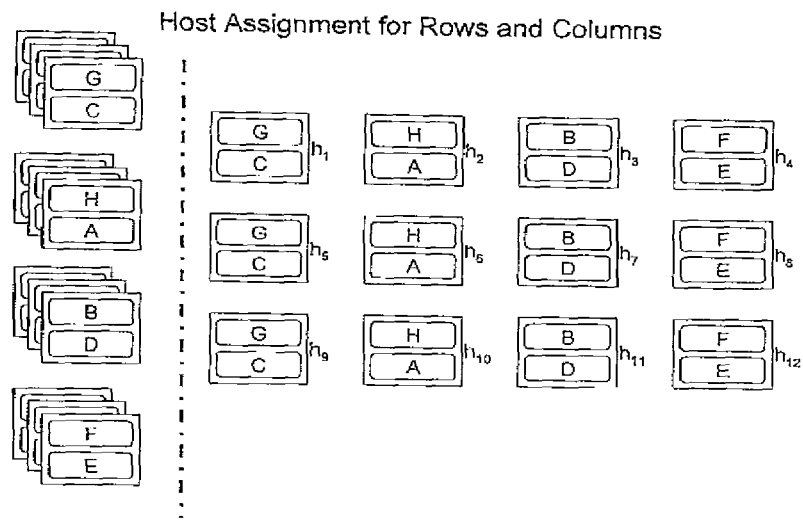

The present invention shall be better understood when the following detailed discussion of its general background and actual embodiments is read in conjunction with the appended drawing figures of which FIG. 1 shows a simplified block diagram of a search engine, as known in the art and discussed hereinabove;

FIG. 2 a diagram of a scalable search engine architecture, as used for the prior art AllTheWeb search service and discussed hereinabove;

FIG. 3 the concept of a mapping function;

FIG. 4 the concept of host assignment;

FIG. 5 the concept of mapping functions for rows and columns; and

FIG. 6 the concept of a classification of keywords.

In order to describe the present invention in full, some assumptions and preliminaries shall be discussed. Then the new framework for index distribution enabled by the method according to the present invention is discussed.

For the present invention, a simplified model of a search engine is introduced. The notation used is summarized in Table 1.

TABLE 1

Notations Used in this Patent Application

| Symbol | Explanation |
| --- | --- |
| $\kappa$ | keyword |
| $K = \{\kappa_1, \ldots, \kappa_n\}$ | set of keywords |
| $D = \{d_1, \ldots, d_m\}$ | set of documents |
| u | a URL |
| n | number of different keywords |
| m | number of documents |
| $(\kappa, u)$ | an occurrence |
| PL(k) | posting list of keyword k |
| \|PL(k)\| | size of the positing list of keyword k |
| q | a query |
| QueryResult(q) | result of processing query q |
| $\omega$ | query workload ($\omega: 2^K \rightarrow R$) |
| $\lambda_\omega(q)$ | interarrival rate of query q under workload $\omega$ |
| h | host |
| $H = \{h_1, \ldots, h_o\}$ | set of hosts |
| o | number of hosts |
| r, c | number of rows and columns, respectively |
| buc | performance of host |
| numPartitions($\kappa$) | number of components of keyword $\kappa$ |
| occLoc(($\kappa$, u)) | number of the component where occurrence ($\kappa$, u) is located |
| numReplicas($\kappa$) | number of replicas of keyword $\kappa$ |
| hostAssign($\kappa$, i, j) | host that stores component-replica i of component j of keyword $\kappa$ |

One has a set of keywords $K=\{\kappa_1, \ldots, \kappa_n\}$ and a set of documents $D=\{d_1, \ldots, d_m\}$. Each document d is a list of keywords, and is identified by a unique identifier called a URL. An occurrence is a tuple $(\kappa, u)$ which indicates that the document associated with the URL u contains the keyword $\kappa$. A document record is a tuple (u, date) that indicates that the document associated with the URL u was created at a given date.

In practice, an occurrence contains other data, for example the position of the keyword in the document or data that are useful for determining the ranking of the document in the output of a query. Also, a document has other associated metadata besides the document record, for example an access control list. Neither of these issues are important for the aspects of the index which are the focus of the following discussion.

The index of a search engine consists of sets of occurrences and a set of document records. There is one set of occurrences for each keyword $\kappa$, hereinafter called the posting set of keyword $\kappa$. The posting set of keyword $\kappa$ contains all occurrences of keyword $\kappa$, and it contains only occurrences of keyword $\kappa$. To be consistent with the prior art, posting sets are presumed to be ordered in a fixed order (for example, lexicographically by URL), and the ordered posting set of a keyword k will be referred to as the posting list PL($\kappa$) of keyword $\kappa$ in the following disclosure. The set of document records contains one document record for each document, and it only contains document records.

Now search queries and query processing shall be discussed in some detail. Users issue queries; and a query q consists of a set of keywords $q=\{\kappa_1, \ldots, \kappa_l\} \subseteq K$. The present invention adopts a model for a query in which a user would like to find every document that contains all the keywords in the query. One can assume that the arrival time of each query q follows an exponential distribution and thus can be characterized by a single parameter $\lambda_q$, the interarrival rate of query q. Note that this probabilistic model of queries implies that queries are independent. A query workload $\omega$ is a function that associates with each query $q\in 2^K$ an arrival rate $\lambda_\omega(q)$. From a query workload one can compute the arrival rate $\lambda_\omega(\kappa)$ of each keyword $\kappa$ by summing over all the queries that contain $\kappa$, formally $$\lambda_\omega(\kappa) = \sum_{q \in 2^K, \kappa \in q} \lambda_\omega(q)$$

The following simplified way of logically processing a query $q=\{\kappa_1, \ldots, \kappa_l\}$ shall be assumed. For each keyword $\kappa_i$ its posting list PL($\kappa_i$) is retrieved for $i \in \{1, \ldots, l\}$, and their intersection in the URL fields are computed. Formally, the following relational algebra expression computes the query result QueryResult(q) for query $q=\{\kappa_1, \ldots, \kappa_l\}$:

$$QueryResult(q) = \pi_{URL} PL(\kappa_1) \cap \ldots \cap \pi_{URL} PL(\kappa_l)$$

There are more sophisticated ways of defining QueryResult (q); for example, the user may only want to see a subset of QueryResult(q), and also may want to see this subset in ranked order.

Physical Setup

The present invention assumes a cluster of workstations modelled as a set of hosts $H=\{h_1, \ldots, h_o\}$ [ACPtNt95]. Further, each host h is assumed to have a single disk with a fixed amount of storage space of DiskSize units. Note that for ease of explanation, the translation of the abstract unit of storage into a concrete unit such as bytes has been omitted in the model. Each occurrence is assumed to have a fixed size of 1 unit. For a keyword $\kappa$ and its posting list PL($\kappa$) the size of the posting list \|PL($\kappa$)\|, is defined as the number of occurrences in PL($\kappa$).

Each host h is assumed to be capable of an associated overall performance that allows it to retrieve buc(h) units of storage within latencyBound milliseconds; this number is an aggregated unit that incorporates CPU speed, the amount of main memory available, and the latency and transfer rate of the disk of the host. Further, in the following, all hosts are assumed to have identical performance, and thus the dependency of buc(h) on h can be dropped and reference just be made to buc as the number of units that any host can retrieve within latencyBound milliseconds.

A framework for index distribution shall now be discussed. Specifically, the framework or architecture as realized according to the method of the present invention encompasses three aspects, viz. partitioning, replication and host assignment, as set out below.

Partitioning

For each keyword, its posting list is partitioned into one or more components. This partitioning of the posting lists into components is done in order to be able to distribute the posting lists across multiple hosts such that all components can be retrieved in parallel.

Replication

For each keyword, each of its components is replicated a certain number of times resulting in several component-replicas for each component. Component-replicas are created for several reasons. The first reason for replication is fault-tolerance; in case a host that stores a component fails, the component can be read from another host. The second reason for replication is improved performance because queries can retrieve a component from anyone of the hosts on which the component is replicated and thus load can be balanced.

Host Assignment

After partitioning and replication, each component-replica of a posting list is assigned to a host, but with the assignment subject to the restriction that no two component-replicas of the same component and the same partition are assigned to the same host. The host assignment enables the location of components to be optimized globally across keywords. One could for example co-locate components of keywords that appear commonly together in queries to reduce the cost of query processing.

Now the corresponding three parts of the index distribution framework according to the method of the present invention shall be introduced.

1. Partitioning the posting lists into components.
2. Replicating the components.
3. Mapping the components to hosts.

For the first part, select a function numPartitions(•) that takes as input a keyword $\kappa$ and returns the number of components into which posting list PL($\kappa$) is partitioned; the resulting components are $C0_1(\kappa)$, $C0_2(\kappa)$, ..., $C0_{numPartitions(\kappa)}(\kappa)$. Also select a function occLoc(•) that takes as input an occurrence and outputs the number of the component in which this occurrence is located. Thus, if occLoc(($\kappa$, u))=i, then ($\kappa$, u)$\in C0_i(\kappa)$. Note that if ($\kappa$, u)$\in$PL($\kappa$), 1$\leq$occLoc(($\kappa$, u))$\leq$numPartitions($\kappa$) holds.

For the second part, select a function numReplicas(•) that takes as input a keyword $\kappa$ and returns the number of component-replicas of the partitions of the posting list of $\kappa$. The original component is included in the number of component-replicas. Thus for a keyword $\kappa$, there exist numReplicas($\kappa$)·numPartitions($\kappa$) component-replicas. If the right numPartitions($\kappa$) components are combined, then they together comprise PL($\kappa$); for any component $C0_i(\kappa)$ one can find numReplicas($\kappa$) identical component-replica. In particular, if in workload $\omega$ keyword $\kappa$ has arrival rate $\lambda_\omega(\kappa)$, and one uniformly balances the load between numReplicas($\kappa$) component-replica, then the arrival rate for this keyword for each of the component-replicas will be $$\frac{\lambda_\omega(\kappa)}{numReplicas(\kappa)}.$$

For the third part select a function hostAssign($\kappa$, i, j) that takes as input a keyword $\kappa$, a replica number i and a component number j and returns the host that stores component-replica i of component j of the posting list in PL($\kappa$). Note that two identical component-replicas (that are replicas of each other) must be mapped to different hosts. Formally, hostAssign($\kappa$, $i_1$, j)$\neq$hostAssign($\kappa$, $i_2$, j) must hold for j$\in\{1, \ldots,$ numPartitions(k)$\}$ and $i_1, i_2\in\{1, \ldots,$ numPartitions($\kappa$)$\}$ with $i_1 \neq i_2$.

FIGS. 3 and 4 show an exemplary instantiation on the framework according to the present invention for a keyword $\kappa$ with a posting list with eight occurrences: A, B, C, D, E, F, G, and H. In the example numPartitions($\kappa$)=4, (i.e. the posting list $\kappa$ is partitioned into four components) and a numReplicas ($\kappa$)=3 (i.e. there are three component-replicas). Five hosts $h_1$, $h_2$, $h_3$, $h_4$, and $h_5$ are given. The function hostAssign($\kappa$, 1, 2)=$h_1$, hostAssign($\kappa$, 2, 2)=$h_2$, hostAssign($\kappa$, 3, 1) $h_5$.

An instantiation of the three functions numPartitions(•) numReplicas(•) and hostAssign ($\kappa$, ij) shall be called a search engine index configuration.

Given the framework as disclosed above, the physical model for processing a query q can now be introduced. Processing a query q involves three steps:

1. For each keyword $\kappa\in$q identify a set of hosts such that if the union of the component-replicas stored at the hosts comprises PL($\kappa$). numReplicas($\kappa$)>1, then there is more than one such set, and one can choose between different sets based on other characteristics, for example the load of a host.
2. For each keyword $\kappa\in$q one needs to retrieve the selected component-replica for all selected hosts.
3. One needs to compute QueryResult(q), which requires intersecting the different posting lists.

Now these three steps shall in turn be addressed.

For the first step, note that function hostAssign($\kappa$, ij) encodes for each keyword $\kappa$ the set of hosts where all the component-replicas of the posting list of $\kappa$ are stored.

For the second step, each host involved in processing query q (as selected in the first step) retrieves all its local component-replicas for all keywords involved in the query.

For the third step, each host will first intersect the local component-replica of all the keyword. Then the results of the local intersections are processed further to complete computation of QueryResult(q).

Now the problem of index design can be defined as follows. A set of hosts that has associated storage space DiskSize and performance buc is given. Also given is a set of keywords with posting lists PL($\kappa_1$), ..., PL($\kappa_m$) that have sizes |PL($\kappa_1$)|, ..., |PL($\kappa_m$)|, as well as a query workload $\omega$.

For the index design problem one needs to find functions numPartitions(•), numReplicas(•), and hostAssign such that the expected latency of answering a query q is below latencyBound, where the expectation is over the set of all possible query sequences.

In the following a discussion of some embodiments shall be given by specific and exemplary instantiations thereof.

1. AllTheWeb Rows and Columns

The AllTheWeb Rows and Columns architecture (in homage to the AllTheWeb search system as described in the introduction hereinabove) is a trivial instantiation of the framework, cf. FIG. 5 which renders the mapping functions for host assignment. In this architecture, there is a matrix of hosts consisting of r rows and c columns. One can visualize this matrix as follows:

$$\begin{pmatrix} h_{1,1} & h_{1,2} & \cdots & h_{1,c} \\ h_{2,1} & h_{2,2} & \cdots & h_{2,c} \\ \vdots & \vdots & \ddots & \vdots \\ h_{r,1} & h_{r,2} & \cdots & h_{r,c} \end{pmatrix}$$

Using a hash function on URLs which is independent of the keyword, the postings of any keyword are approximately evenly partitioned into c components. Each component is then replicated within the column, one component-replica for each row, resulting in r component-replicas. To reconstruct the posting list of a keyword, one host from each column needs to be accessed, but it is not necessary to select these hosts all from the same row, and this flexibility simplifies query load balancing between hosts and improves fault tolerance.

To make the connection to the notation of the framework as realized by the method of the present invention, the three above-mentioned functions must be instantiated. First, due to the row and column schema, one has that for all keywords κ∈K, numPartitions(κ)=c, and numReplicas(κ)=r hold, and for all URLs u and $κ_1, κ_2 \in K$ the following must hold:

occLoc(($κ_1$,u))=occLoc(($κ_2$,u)), i.e. for a URL u, the function occLoc((κ, u)) is independent of the keyword κ. The function hostAssign is also quite simple. Let hostAssign(κ, ij)=(ij), where i is the row of the host and j indicates the column of the host in the r×c matrix. Note that if the number of columns c is suitably chosen, then all the component-replicas of any single keyword κ can be read in parallel within the latencyBound. The smallest number c is the following:

$$c = \max_\kappa \left\lceil \frac{|PL(\kappa)|}{buc} \right\rceil.$$

When performing query processing in the AllTheWeb Rows and Columns architecture as shown in FIG. 2, only one host in each column needs to be involved even for multi-keyword queries since the function occLoc((κ, u)) is independent of κ.

However, AllTheWeb Rows and Columns has several disadvantages. Firstly, the number of hosts accessed for a keyword κ is independent of the length of κ's posting list; c hosts must always be accessed even for keywords with very short posting lists. Secondly, AllTheWeb Rows and Columns does not take keyword popularity in the query workload into account; every component is replicated r times even if the associated keyword is accessed only quite infrequently. Thirdly, changes in the physical setup for AllTheWeb Rows and columns are constrained to additions of hosts in multiples of c or r at once, resulting in an additional row or an additional column in the architecture.

Addition of a new (c host) row is relatively straightforward; addition of a new (r host) column, however, is non-trivial. To illustrate this point, consider an instance of AllTheWeb Rows and Columns with r rows and c columns and which uses associated function occLocc(•) with range {1, . . . , c}. When adding another row, a new function occLoc'(•) with range {1, . . . , c+1} must be selected, and in general occLoc((κu))≠occLoc'((κu)), will hold, so all posting lists need to be repartitioned according to occLoc'(•), which basically results in re-building of the whole index.

2. Fully Adaptive Rows and Columns

Now, a solution according to the present invention that takes into account both the difference in the sizes of posting lists and the difference in popularity of keywords in the query shall be described. The essence of this novel solution is that one instantiates AllTheWeb Rows and Columns differently for each keyword: Each keyword may have a different number of rows and columns. In other words, applying the method of the present invention shall provide a solution with fully adaptive rows and columns.

Consider a keyword κ. Start with an instantiation of numPartitions(κ). Since each host can only retrieve buc units while satisfying the global query latency requirement of latencyBound, PL(κ) is partitioned into $$numPartitions(\kappa) = \left\lceil \frac{|PL(\kappa)|}{buc} \right\rceil$$

components. Thus each component is sized such that it can be read within the query latency requirement from a single host. Note that for a keyword having very short posting lists, one (or very few) components are created, whereas for keywords having very long posting lists, many components are created.

The question now is how many component-replicas should be created for a keyword κ. Recall that component-replicas are created for fault tolerance and in order to distribute the query workload across hosts. To tolerate f unavailable hosts, numReplicas(κ)≥f is enforced. To balance the query workload, posting lists of popular keywords (in the query workload) are replicated more often than posting lists of rare keywords. So the number of replicas is made inversely proportional to the arrival rate of the keyword in the workload.

By making numPartitions(κ) and numReplicas(κ) different for each keyword κ, one obtains a number of rows and columns that is specific for each keyword. The number of columns still indicates the number of partitions, and the number of rows indicates the number of replicas for each partition. However, keywords with long posting lists have many columns, and keywords with short posting lists have few columns. Popular keywords have many rows, unpopular keywords have few rows. As compared to AllTheWeb Rows and Columns, Fully Adaptive Rows and Columns results in less imbalance in the sizes of the components for different keywords. Thus one has achieved that each component-replica is now normalized in the sense that each component-replica has approximately the same size (up to a difference of buc) and has approximately the same arrival rate.

There are many different ways of assigning component-replicas to hosts. Given o hosts, one possibility would be to hash each keyword κ onto one of the numbers from 1 to o, and then to assign the components sequentially (mod o) to hosts. Conceptually, for a keyword κ this embeds κ's specific matrix with numPartitions(κ) columns and numReplicas(κ) rows sequentially into the o hosts. Formally, the assignment function has the following form. Let keywHash(•) be a function from K to {1, . . . , o} with the property that $$P[keywHash(\kappa) = i] = \frac{1}{o},$$

for $i \in K$ to $\{1, \ldots, o\}$ and $\kappa \in K$. Then one can lay out the submatrix for keyword $\kappa$ in H row by row as follows:

$$\text{hostAssign}(\kappa,i,j) = (\text{keywHash}(\kappa) + (i-1)\cdot\text{numPartitions}(\kappa) + (j-1)) \bmod o, \quad (5)$$

where $i \in \{1, \ldots, \text{numReplicas}(\kappa)\}$ and $j \in \{1, \ldots, \text{numPartitions}(\kappa)\}$, With this instantiation of hostAssign, the question now is how many component-replicas will be assigned to a host. With Fully Adaptive Rows and Columns the following simple theorem shows that there will not be much imbalance between two hosts with respect to the number of component-replicas.

Theorem 1

Let s be the total number of component-replicas created over all keywords $\kappa$, formally $$s = \sum_{\kappa \in K} \text{numPartitions}(\kappa) \cdot \text{numReplicas}(\kappa)$$

Let o be the number of hosts, and assume hostAssign is defined as in the previous paragraph, and assume that $s=\Omega(o)$. Then the maximum number of component-replicas at each host $h \in H$ is $\Theta(s/o)$, i.e. the maximum number of component-replicas assigned to any host is on the order of the mean number of component-replicas assigned to any host.

Proof

Follows from bounds on balls into bins [MR95].

To retrieve the posting list of a keyword $\kappa$ in processing a search query, select any one host from each of the numPartitions($\kappa$) "virtual columns" of $\kappa$'s matrix; thus the number of different possibilities for choosing this set is numPartitions$(\kappa)^{\text{numReplicas}(\kappa)}$.

Processing queries with multiple keywords in Fully Adaptive Rows and Columns is much more expensive than in AllTheWeb Rows and Columns. For example, consider a keyword query $q=\{\kappa_1, \kappa_2\}$ where numPartitions($\kappa_1$)≠numPartitions($\kappa_2$). Since keywords $\kappa_1$ and $\kappa_2$ are partitioned differently, the posting list of say, $\kappa_1$, must be repartitioned to match the partitioning of $\kappa_2$, an expensive operation. In addition, there is no guarantee that any components of $\kappa_1$ and $\kappa_2$ are co-located at the same host.

3. Two-Class Rows and Columns

A third instantiation of the framework as realized by the method of the present invention is a special case of Fully Adaptive Rows and Columns that results in much simpler (and cheaper) query processing. As in AllTheWeb Rows and Columns, it is assumed that $r \cdot c$ hosts are arranged in the usual matrix of hosts.

For Two-Class Rows and Columns, the keyword is classified along two axes. The first axis is the size of the posting list, where keywords are partitioned into short and long keywords based on the size of their posting lists. The second axis is the arrival rate of the keywords in the query workload where keywords are partitioned into popular and unpopular keywords based on their arrival rate. This results in four different classes of keywords:

Short unpopular (SU) keywords. The posting lists of an SU keyword $\kappa$ are not partitioned, and one creates the minimum number of component-replicas to achieve the desired level of fault-tolerance. Thus for an SU keyword $\kappa$; one sets numPartitions($\kappa$)=1, and numReplicas($\kappa$)=f.

Long unpopular (LU) keywords. The posting lists of an LU keyword $\kappa$ are partitioned into c components, and f component-replicas are created for each component to achieve fault-tolerance. Thus for an LU keyword $\kappa$ one sets numPartitions($\kappa$)=c, and numReplicas($\kappa$)=f.

Short popular (SP) keywords. The posting lists of an SP keyword $\kappa$ are not partitioned, and r component-replicas of $\kappa$'s posting list are created to distribute $\kappa$'s arrival rate across hosts. Thus for an SP keyword $\kappa$ respectively set numPartitions($\kappa$)=1, and numReplicas($\kappa$)=r.

Long popular (LP) keywords. The posting lists of an LP keyword $\kappa$ are partitioned into c components and each component is replicated r times. Thus, for an LP keyword $\kappa$ respectively set numPartitions($\kappa$)=c, and numReplicas($\kappa$)=r.

This instantiation of the two functions numPartitions(•) and numReplicas(•) from the present framework for the different classes of keywords is shown in Table 2. Note that compared to Fully Adaptive Rows and Columns, in Two-Class Rows and Columns there are only four different types of matrices as depicted in FIG. 6, where the level of fault-tolerance f=2.

TABLE 2

Classification of Keywords: Functions (numPartitions($\kappa$), numReplicas($\kappa$))

|  |  | Posting List Length | |
|---|---|---|---|
|  |  | Short | Long |
| Arrival Rate | Unpopular | (1, f) | (c, f) |
|  | Popular | (1, r) | (c, r) |

Let keywHash(•) be as defined and disclosed in connection with the discussion of fully adaptive Rows and Columns hereinabove. Let rowHash(•,•) be a function from $K \times \{1, \ldots, f\}$ to $\{1, \ldots, r\}$ such that rowHash($\kappa, i_1$)≠rowHash($\kappa, i_2$) for $i_1, i_2 \in \{1, \ldots, r\}$. How the component-replicas of a keyword are assigned to hosts depends on the class of the keyword.

For an SU keyword $\kappa_{SU}$, one defines $$\text{hostAssign}(\kappa_{SU},i,1) = (\text{rowHash}(\kappa,i), (\text{keywHash}(\kappa_{SU}) \bmod c) + 1)),$$

for $i \in \{1, \ldots, f\}$.

For an LU keyword $\kappa_{LU}$, one defines $$\text{hostAssign}(\kappa_{LU},i,j) = (\text{rowHash}(\kappa,i), j),$$

for $i \in \{1, \ldots, f\}$ and $j \in \{1, \ldots, c\}$.

For an SP keyword $\kappa_{SP}$, one defines $$\text{hostAssign}(\kappa_{SP},i,1) = (i, (\text{keywHash}(\kappa_{SU}) \bmod c) + 1),$$

for $i \in \{1, \ldots, r\}$.

For an LP keyword $\kappa_{LP}$, one defines $$\text{hostAssign}(\kappa_{LP},i,j) = (i,j),$$

for $i \in \{1, \ldots, r\}$ and $j \in \{1, \ldots, c\}$.

Similar to the previous section, the following theorem can be proved.

Theorem 2

Let s be the total number of component-replicas created over all keywords $\kappa$, (independent of the class of $\kappa$), formally $$s = \sum_{\kappa \in K} \text{numPartitions}(\kappa) \cdot \text{numReplicas}(\kappa)$$

Let o be the number of hosts, and assume hostAssign is defined as in the previous paragraph. Then the maximum number of component-replicas at each host $h \in H$ is $\Theta(s/o)$, i.e.

the maximum number of component-replicas assigned to any host is on the order of the mean number of component-replicas assigned to any host.

Proof

Follows from bounds on balls into bins [MR95].

Given the functions hostAssign($\kappa$,•,•) for the different classes of keywords, query processing in Two-Class Rows and Columns is not very complicated, and there are usually many choices of how to process a query. Table 3 describes how to process a query $q=\{\kappa_1, \kappa_2\}$ with two keywords; query processing for queries with more than two keywords is analogues.

The set of possible sets of hosts to choose for query processing is straightforward given this discussion.

TABLE 3

Query Processing for Pairs of Keywords in Two-Class Rows and Columns

| $\kappa_1, \kappa_2$ | Description |
|---|---|
| SU, SU | The posting list for any SU keyword just resides on a single host. Assuming without loss of generality that $|PL(\kappa_1)| < |PL(\kappa_2)|$, read the posting list for keyword $\kappa_1$ and sent it to the host where the posting list for keyword $\kappa_2$ resides. |
| SU, LU | Partition the posting list of $\kappa_1$ on-the-fly and send it to all the hosts in the row where $\kappa_2$ is stored. |
| SU, LP | The posting list of $\kappa_2$ is partitioned, but not the posting list of $\kappa_1$. Thus one must partition the posting list of $\kappa_1$ on-the-fly and send it to all the hosts in the row where $\kappa_2$ is stored. |
| SU, SP | There are two possibilities. If both the posting list of $\kappa_1$ and a replica of the posting list $\kappa_2$ reside on the same column, then perform the intersection locally at the host where the posting list of $\kappa_1$ resides. Otherwise, either send any of the component-replicas of keyword $\kappa_2$ to the host where $\kappa_1$ resides or vice versa. |
| LU, LU | The posting lists of both keywords are already partitioned (recall that they are partitioned using the same hashing function, a hash on the URL of the document). Thus one can intersect the corresponding component-replica; e.g. the first component-replica of the posting list of keyword $\kappa_2$ with the first component-replica of the posting list of keyword $\kappa_2$ and so on. |
| LU, LP | There exists a row where a replica of both posting lists resides and the intersection of the partitions of the two posting lists can happen locally at each host of this row. |
| LU, SP | Take any of the hosts where the posting list of $\kappa_2$ resides, partition the posting list and send it to the row where the posting list of $\kappa_1$ has been partitioned. |
| LP, LP | Note that for all LP keywords components and component-replicas have been created according to AllTheWeb Rows and Columns and thus query processing can proceed as in AllTheWeb Rows and Columns. |
| LP, SP | Partition the posting list of $\kappa_2$ and then send it to the hosts in one of the rows. |
| SP, SP | If both posting lists already reside on the same column, then one can choose one of these hosts and perform the intersection locally. Otherwise, either send the posting list of $\kappa_1$ to one of the hosts where the posting list of $\kappa_2$ resides, or vice versa. |

Based on the instantiation framework as provided by the method of the present invention and discussed hereinabove, a few practical considerations will be outlined in the following.

Firstly, applying the method of the present invention allows an extension of the search system framework that permits each keyword to have more than a single row-and-column instance. This shall be described immediately below.

In the above-mentioned embodiments there has so far assumed that for each keyword $\kappa$ there are two functions numPartitions($\kappa$) and numReplicas($\kappa$). However, for performance reasons, one may partition with a keyword $\kappa$ in more than one way and possibly have a different number of replicas for the different partitionings. For example, in Two-Class Rows and Columns, the posting list for an SP keyword $\kappa_{SP}$ is replicated across one column. In addition to the current replication, the posting list of $\kappa_{SP}$ might have been partitioned across one row, because $\kappa_{SP}$ often co-occurs with a second LP keyword $\kappa_{LP}$ that is partitioned across all rows.

This extension can be characterized by associating sets of functions from the resulting framework with each keyword applying the method of the invention; for example, a keyword $\kappa$ could have two sets of functions $\{numPartitions_1(\kappa), numReplicas_1(\kappa)\}$ and $\{numPartitions_2(\kappa), numReplicas_2(\kappa)\}$. The number of sets could be keyword-dependent. This greatly increases the possible choices for query processing. However, this extension formally shall not be introduced formally herein since it is conceptually straightforward.

Secondly, a person skilled in the art shall realize that applying the method of the invention to creating frameworks for real search systems, including enterprise search systems, may allow for various optimizations thereof. Such optimizations shall take the method of the present invention as their point of departure, but their reduction of practice is considered to lie outside the scope of the present invention, and they shall hence not be elaborated further herein.

The method of the present invention realizes a framework for distributing the index of a search engine across several hosts in a computing cluster. The framework as disclosed distinguishes three orthogonal mechanisms for distributing a search index: Index partitioning, index replication, and assignment of replicas to hosts. Instantiations of these mechanisms yield different ways of distributing the index of a search engine, including popular methods from the literature and novel methods that by far outperform the prior art in terms of resource usage and performance while achieving the same level of fault tolerance.

Further the method of the present invention for the first time recognizes that different keywords and different documents in a search engine might have different properties (such as length or frequency of access). The framework realized by applying the method of the present invention creates a configuration of the index of a search engine according to these properties. The framework also serves to outline how to process queries for the space of configurations made possible by its realizations.

Instantiations of this framework moreover lead to existing index configurations disclosed in prior art as well as novel index configurations that are not possible in the prior art.

APPENDIX

References

[ACPtNt95] Thomas E. Anderson, David E. Culler, David A. Patterson, and the NOW team. A case for NOW (networks of workstations). *IEEE Micro*, 15(1)54-64, February 1995.

[AM06] Vo Ngoc Anh and Alistair Moffat. Pruned query evaluation using pre-computed impacts. In Efthimis N. Efthimiadis, Susan T. Dumais, David Hawking, and Kalervo Järvelin, editors, *SIGIR*, pages 372-379. ACM, 2006.

[Bad01] C. S. Badue. Distributed query processing using partitioned inverted files. Master's thesis, Federal University of Minas Gerais, 2001.

[BCL06] Stefan Büttcher, Charles L. A. Clarke, and Brad Lushman. Hybrid index maintenance for growing text collections. In Efthimis N. Efthimiadis, Susan T. Dumais, David Hawking, and Kalervo Järvelin, editors, *SIGIR*, pages 356-363. ACM, 2006.

[BJRS03] Mayank Bawa, Roberto J. Bayardo Jr., Sridhar Rajagopalan, and Eugene J. Shekita. Make it fresh, make it quick: searching a network of personal webservers. In *WWW*, pages 577-586, 2003.

[CAN02] Francisco Matias Cuenca-Acuna and Thu D. Nguyen. Text-based content search and retrieval in ad-hoc P2P communities. In Enrico Gregori, Ludmila Cherkasova, Gianpaolo Cugola, Fabio Panzieri, and Gian Pietro Picco, editors, NETWORKING Workshops, volume 2376 of *Lecture Notes in Computer Science*, pages 220-234. Springer, 2002.

[CKE+90] Cringean, Janey K., Roger England, Manson, Gordon A., and Peter Willett. Parallel text searching in serial files using a processor farm. In *Proceedings of the Thirteenth Annual International ACM SIGIR Conference on Research and Development in Information Retrieval*, Access Methods, pages 429-453, 1990.

[CPD06] Soumen Chakrabarti, Kriti Puniyani, and Sujatha Das. Optimizing scoring functions and indexes for proximity search in type-annotated corpora. In Les Carr, David De Roure, Arun Iyengar, Carole A. Goble, and Michael Dahlin, editors, *WWW*, pages 717-726. ACM, 2006.

[DEFS06] Pavel A. Dmitriev, Nadav Eiron, Marcus Fontoura, and Eugene J. Shekita. Using annotations in enterprise search. In Les Carr, David De Roure, Arun Iyengar, Carole A. Goble, and Michael Dahlin, editors, *WWW*, pages 811-817. ACM, 2006.

[DGG+86] David J. DeWitt, Robert H. Gerber, Goetz Graefe, Michael L. Heytens, Krishna B. Kumar, and M. Muralikrishna. GAMMA—A high performance dataflow database machine. In *Proceedings of the 12th International Conference on Very Large Data Bases*, pages 228-237, 1986.

[Fag99] Ronald Fagin. Combining fuzzy information from multiple systems. *J. Comput. Syst. Sci*, 58(1):83-99, 1999.

[JRMG06] Rosie Jones, Benjamin Rey, Omid Madani, and Wiley Greiner. Generating query substitutions. In Les Carr, David De Roure, Arun Iyengar, Carole A. Goble, and Michael Dahlin, editors, *WWW*, pages 387-396. ACM, 2006.

[KCMK06] Reiner Kraft, Chi-Chao Chang, Farzin Maghoul, and Ravi Kumar. Searching with context. In Les Carr, David De Roure, Arun Iyengar, Carole A. Goble, and Michael Dahlin, editors, *WWW*, pages 477-486. ACM, 2006.

[Kro02] Amr Z. Kronfol. FASD: A fault-tolerant, adaptive, scalable, distributed search engine, Dec. 20, 2002.

[LLH+03] Li, Loo, Hellerstein, Kaashoek, Karger, and Morris. On the feasibility of peer-to-peer web indexing and search. In *International Workshop on Peer-to-Peer Systems (IPTPS), LNCS*, volume 2, 2003.

[LLQ+07] Yu-Ting Liu, Tie-Yan Liu, Tao Qin, Zhi-Ming Ma, and Hang Li. Supervised rank aggregation. In *WWW*, pages 481-489. ACM, 2007.

[LT1T07] Gang Luo, Chunqiang Tang, and Ying li Tian. Answering relationship queries on the web. In *WWW*, pages 561-570. ACM, 2007.

[MMR00] Andy MacFarlane, Julie A. McCann, and Stephen E. Robertson. Parallel search using partitioned inverted files. In *SPIRE*, pages 209-220, 2000.

[MR95] Rajeev Motwani and Prabhakar Raghavan. *Randomized Algorithms*. Cambridge University Press, 1995.

[MWZ06] Alistair Moffat, William Webber, and Justin Zobel. Load balancing for term-distributed parallel retrieval. In Efthimis N. Efthimiadis, Susan T. Dumais, David Hawking, and Kalervo Järvelin, editors, *SIGIR*, pages 348-355. ACM, 2006.

[MYL02] Meng, Yu, and Liu. Building efficient and effective metasearch engines. *CSURV: Computing Surveys*, 34, 2002.

[ODODG02] 1977 Omprakash D. (Omprakash Dev) Gnawali. A keyword-set search system for peer-to-peer networks. Master's thesis, Massachusetts Institute of Technology, Dept. of Electrical Engineering and Computer Science, 2002.

[PZSD96] Michael Persin, Justin Zobel, and Ron Sacks-Davis. Filtered document retrieval with frequency-sorted indexes. *JASIS*, 47(10):749-764, 1996.

[RNB98] B. Ribeiro-Neto and R. Barbosa. Query performance for tightly coupled distributed digital libraries. In *Proceedings of the Third ACM International Conference on Digital Libraries*, pages 182-190, June 1998.

[RPB06] Matthew Richardson, Amit Prakash, and Eric Brill. Beyond pagerank: machine learning for static ranking. In Les Carr, David De Roure, Arun Iyengar, Carole A. Goble, and Michael Dahlin, editors, *WWW*, pages 707-715. ACM, 2006.

[RV03] Patrick Reynolds and Amin Vahdat. Efficient peer-to-peer keyword searching. In Markus Endler and Douglas C. Schmidt, editors, *Middleware*, volume 2672 of *Lecture Notes in Computer Science*, pages 21-40. Springer, 2003.

[SL02] Yipeng Shen and Dik Lun Lee. An MDP-based peer-to-peer search server network. In Tok Wang Ling, Umeshwar Dayal, Elisa Bertino, Wee Keong Ng, and Angela Goh, editors, *WISE*, pages 269-278. IEEE Computer Society, 2002.

[SMwW+03] Torsten Suel, Chandan Mathur, Jo wenWu, Jiangong Zhang, Alex Delis, Mehdi Kharrazi, Xiaohui Long, and Kulesh Shanmugasundaram. ODISSEA: A peer-to-peer architecture for scalable web search and information retrieval. In Vassilis Christophides and Juliana Freire, editors, *WebDB*, pages 67-72, 2003.

[TD04] Chunqiang Tang and Sandhya Dwarkadas. Hybrid global-local indexing for efficient peer-to-peer information retrieval. In *NSDI*, pages 211-224. USENIX, 2004.

[TGM93] A. Tomasic and H. Garcia-Molina. Performance of inverted indices in shared-nothing distributed text document information retrieval systems [selected best paper]. In *Parallel and Distributed Information Systems* (PDIS '93), pages 8-17, Los Alamitos, Calif., USA, January 1993. IEEE Computer Society Press.

[TKT06] Taro Tezuka, Takeshi Kurashima, and Katsumi Tanaka. Toward tighter integration of web search with a geographic information system. In Les Carr, David De Roure, Arun Iyengar, Carole A. Goble, and Michael Dahlin, editors, *WWW*, pages 277-286. ACM, 2006.

[TXD03] Chunqiang Tang, Zhichen Xu, and Sandhya Dwarkadas. Peer-to-peer information retrieval using self-organizing semantic overlay networks. In Anja Feldmann, Martina Zitterbart, Jon Crowcroft, and David Wetherall, editors, *SIGCOMM*, pages 175-186. ACM, 2003.

[TXM03] Chunqiang Tang, Zhichen Xu, and Mallik Mahalingam. psearch: information retrieval in structured overlays. *Computer Communication Review,* 33(1):89-94, 2003.

[YJ06] Beverly Yang and Glen Jeh. Retroactive answering of search queries. In Les Carr, David De Roure, Arun Jyengar, Carole A. Goble, and Michael Dahlin, editors, *WWW*, pages 457-466. ACM, 2006.

[ZS07] Jiangong Zhang and Torsten Suel. Efficient search in large textual collections with redundancy. In *WWW*, pages 411-420. ACM, 2007.

The invention claimed is:

1. A method for improving the efficiency of a search engine in accessing, searching and retrieving information in the form of documents stored in document or content repositories, comprising:

using an indexing subsystem of the search engine to crawl the stored documents and generate an index, wherein applying a user search query to the index returns a result set of at least some query-matching documents, wherein the search engine comprises an array of search nodes hosted on one or more servers, wherein the array of search nodes comprises r rows and c columns characterized by classifying a query keyword in two dimensions, a first dimension being a posting list size and a second dimension being an arrival rate that is determined using an arrival time of each query keyword, and wherein the index of the search engine is configured on a basis of one or more document properties, at least one of a fault-tolerance level, a required search performance, document meta-properties, and an optimal resource utilization;

partitioning the index;

replicating the index to create replicas that each comprise a same content as each of the other replicas;

distributing the partitioned and replicated index over the array of search nodes such that index partitions and replicas thereof are assigned to the servers hosting the array of search nodes, wherein distributing the index takes into account at least one of: posting lists size differences and posting lists popularity differences; and processing a search query on the basis of the distributed index.

2. The method of claim 1, wherein distributing the index comprises distributing the index such that a search query latency is below a user-specified latency bound.

3. The method of claim 1, wherein processing the search query comprises processing the search query with posting lists that have different classifications.

4. The method of claim 3, further comprising classifying search query posting lists on the basis of length and popularity, the latter being determined by user access patterns.

5. The method of claim 4, wherein the array of search nodes comprises r rows and c columns, characterized by using a number of partitions that is different from the number of replicas for each query keyword, such that the number of rows and columns are different for each query keyword.

6. The method of claim 4, wherein the array of search nodes comprises r rows and c columns characterized by classifying the query keyword in two dimensions, the first dimension being a posting list size and the second dimension an arrival rate of each query keyword, such that a query keyword is partitioned in the first dimension as respectively short and long and in the second dimension as respectively popular and unpopular, and wherein distributing the index takes into account at least one of posting lists size differences, posting lists popularity differences, and the cost of processing a search query.

7. The method of claim 3, further comprising dividing search query posting lists into components for balancing a query-processing load between the search nodes.

8. The method of claim 7, further comprising replicating posting list components, creating identical replicas thereof, for increasing the fault-tolerance level.

9. The method of claim 8, further comprising assigning the component replicas to the search nodes for balancing a query-processing load.

10. The method of claim 1, wherein distributing the index comprises distributing the index of the search engine on a two-dimensional linearly scalable array of search nodes, wherein scaling as per se is used for handling variations in a data volume or in a search query frequency or both.

11. The method of claim 1, wherein the array of search nodes comprises r rows and c columns characterized by classifying the query keyword in two dimensions, the first dimension being a posting list size and the second dimension an arrival rate of each query keyword, such that a query keyword is partitioned in the first dimension as respectively short and long and in the second dimension as respectively popular and unpopular.

12. A system for improving the efficiency of a search engine in accessing, searching and retrieving information in the form of documents stored in document or content repositories, comprising:

a processor;

an indexing subsystem of the search engine that crawls the stored documents and generates an index, wherein applying a user search query to the index returns a result set of at least some query-matching documents, wherein the search engine comprises an array of search nodes hosted on one or more servers, wherein the array of search nodes comprises r rows and c columns characterized by classifying a query keyword in two dimensions, a first dimension being a posting list size and a second dimension an arrival rate that is determined using an arrival time of each query keyword, and wherein the index of the search engine is configured on a basis of one or more document properties, at least one of a fault-tolerance level, a required search performance, document meta-properties, and an optimal resource utilization;

partitioning the index;

replicating the index to create replicas that each comprise a same content as each of the other replicas;

distributing the partitioned and replicated index over the array of search nodes such that index partitions and replicas thereof are assigned to said one or more servers hosting the array of search nodes, wherein distributing the index takes into account at least one of: posting lists size differences and posting lists popularity differences; and processing a search query on the basis of the distributed index.

13. The system of claim 12, wherein the array of search nodes comprises r rows and c columns characterized by classifying the query keyword in two dimensions, the first dimension being a posting list size and the second dimension an arrival rate of each query keyword, such that a query keyword is partitioned in the first dimension as respectively short and long and in the second dimension as respectively popular and unpopular.

14. The system of claim 13, wherein distributing the index takes into account at least one of posting lists size differences, posting lists popularity differences, and the cost of processing a search query.

15. The system of claim 12, wherein distributing the index comprises distributing the index such that a search query latency is below a user-specified latency bound.

16. The system of claim 12, wherein processing the search query comprises processing the search query with posting lists that have different classifications.

17. The system of claim 16, further comprising classifying search query posting lists on the basis of length and popularity, the latter being determined by user access patterns.

18. The system of claim 12, wherein distributing the index comprises distributing the index of the search engine on a two-dimensional linearly scalable array of search nodes, wherein scaling as per se is used for handling variations in a data volume or in a search query frequency or both.

19. A memory storing computer executable instructions that when executed perform actions, comprising:

partitioning an index generated by a search engine that crawls stored documents;

replicating the index to create replicas that each comprise a same content as each of the other replicas;

distributing the partitioned and replicated index over an array of search nodes such that index partitions and replicas thereof are assigned to said one or more servers hosting the array of search nodes, wherein the array of search nodes comprises r rows and c columns characterized by classifying a query keyword in two dimensions, a first dimension being a posting list size and a second dimension an arrival rate that is determined using an arrival time of each query keyword, wherein distributing the index takes into account at least one of: posting lists size differences and posting lists popularity differences; and processing a search query on the basis of the distributed index.

20. The memory of claim 19, wherein the array of search nodes comprises r rows and c columns characterized by classifying the query keyword in two dimensions, the first dimension being a posting list size and the second dimension an arrival rate of each query keyword, such that a query keyword is partitioned in the first dimension as respectively short and long and in the second dimension as respectively popular and unpopular.

* * * * *